April 13, 1926.
F. POLLIFRONE
1,581,079
EMERGENCY AUTOMOBILE BRAKE
Filed Dec. 9, 1924
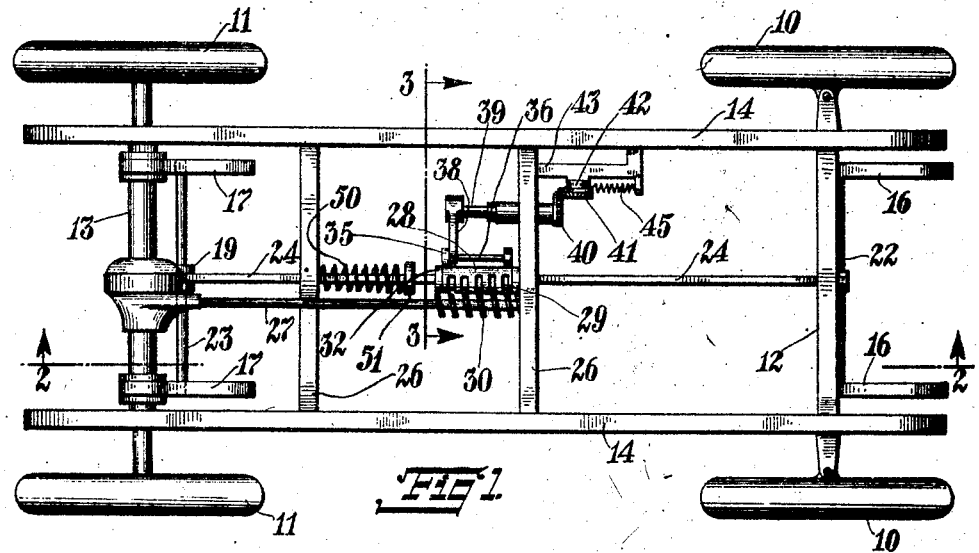

Patented Apr. 13, 1926.

1,581,079

UNITED STATES PATENT OFFICE.

FRANK POLLIFRONE, OF BROOKLYN, NEW YORK.

EMERGENCY AUTOMOBILE BRAKE.

Application filed December 9, 1924. Serial No. 754,702.

*To all whom it may concern:*

Be it known that I, FRANK POLLIFRONE, a subject of the King of Italy, residing at Brooklyn, in the county of Kings and State of New York, have invented certain new and useful Improvements in Emergency Automobile Brakes, of which the following is a specification.

This invention relates generally to emergency means for stopping automobiles, the invention having more particular reference to means of this sort in which one or more drags are dropped to the ground when the automobile is to be quickly stopped.

The invention has for an object the provision of a novel and improved device of this sort provided with positive actuating means for the drag that may be put in operation by the moving of a suitable hand lever.

For further comprehension of the invention, and of the objects and advantages thereof, reference will be had to the following description and accompanying drawing, and to the appended claims in which the various novel features of the invention are more particularly set forth.

Fig. 1 of the drawing is a plan view showing an automobile chassis having the invention applied thereto.

Fig. 2 is a longitudinal sectional view taken on the line 2—2 of Fig. 1.

Fig. 3 is a transverse sectional view taken on the line 3—3 of Fig. 1.

In the drawing the front wheels of an automobile are indicated at 10 and the rear wheels at 11, the front and rear axles being indicated at 12 and 13 respectively, and the usual side frame members of the chassis at 14. According to my invention I attach to the front and rear axles drag members that are normally held in raised position and are lowered to contact with the ground when the automobile is to be quickly stopped. There are a front pair of these members, shown at 16 and a rear pair shown at 17. These members comprise approximately triangular arms that have curved outer ends which may be roughened as shown to more securely grip the ground.

The front members 16 are pivoted to bracket elements or lugs 18 depending from the front axle, while the rear members are formed with apertures through which the rear axle passes, to pivot the said rear members upon the said rear axle, these members being retained against displacement along the said rear axle by means of the collars 19 fixed to the latter, on opposite sides of the said members. The front members 16 are preferably arranged to impart a lifting action to the front end of the automobile when the device is put into operation so as to assist in the quick stopping of the automobile.

The two front drag members 16 are connected together by a rigid crossbar 22, while a similar crossbar 23 connects the rear members 17 together. These crossbars have pivotally attached thereto the ends of a rigid, longitudinally extending link or bar 24, longitudinal movement of which acts to swing the said members to operative position. This bar 24 is guided by means of transverse elements 26 fixed to the chassis of the automobile and the said elements having apertures therein through which the bar passes freely, these apertures allowing for a certain amount of vertical movement of the bar in addition to its longitudinal movement. The bar 24 is located in close adjacence to the drive shaft 27 of the automobile and has mounted thereof, between its ends short sleeve or tube 28 which is formed on one side with projecting teeth 29 that are normally turned away from the said shaft, but may be turned through a desired arc to cause the said teeth to be projected toward the said shaft and engage with a worm or thread element 30 on the said shaft. The sleeve 28 is free to rotate on the bar 24 and is held against longitudinal displacement with relation to the bar by means of collars 32 fixed to the bar at opposite ends of the sleeve.

The sleeve 28 is arranged to be given a partial rotation to bring the teeth 29 thereon into engagement with the worm 30 on the shaft 27 by the following means. Projecting from the sleeve, near opposite ends thereof, are the arms 35 to the ends of which are secured a rod 36 that extends parallel to the sleeve. This rod passes through a slot 37 in the end of an arm 38 fixed to the rear end of a longitudinally extending rock-shaft 39 which has a bevel gear segment 40 fixed on its front end. This bevel gear segment 40 meshes with a like segment 41 on the lower end of a hand lever 42 that is fulcrumed to a supporting bracket 43 and projects up through the floor of the driver's compartment to be conveniently gripped by the driver. Connected at one end to this lever, and at its other end to a projection from the bracket 43 is a tension spring 45 that acts to retain the lever in position with the teeth on the sleeve turned away from the worm on the shaft. A foot pedal may be provided instead of this hand lever, if desired.

To apply my improved emergency stopping device it is only necessary to pull on the lever 42 causing the sleeve 28 to be rotated to bring the teeth 29 thereon into engagement with the worm 30 of the shaft 27, when the rotation of the latter which continues even for a short time even after the power has been shut off, acting to cause the sleeve to be moved backward, the sleeve carrying the bar 24 with it and throwing the drag members downward to engage the ground.

The vehicle may be conditioned to continue its journey by manually backing same off the drag members, and to return the drag members to raised position I may provide an expansion spring 50 that surrounds the bar 24 and bears at one end on one of the collars 51 and at its other end on one of the crossbars 26.

Having thus described my invention, what I claim as new and desire to protect by Letters Patent of the United States is as follows:—

1. In an automobile a normally elevated drag, a drive shaft, and means for establishing an operative connection between the said drag and the said shaft whereby the drag may be moved between raised and lowered positions by rotation of the said shaft, said means including a worm on the said shaft, a partially rotatable sleeve having teeth thereon adapted to be moved into and out of engagement with the worm on the shaft by rotation of the sleeve, and a bar on which the sleeve is mounted, said bar being connected to the said drag and being arranged for longitudinal movement by and with the said sleeve to move the said drag between operative and inoperative position.

2. In an automobile, a pivotally mounted drag, a drive shaft, a worm on the said drive shaft, a bar connected to the said drag, a sleeve rotatable on said bar but held against longitudinal displacement thereon, teeth projecting from one side of said sleeve and adapted to be moved into and out of engagement with the said worm by rotary movement of the said sleeve, and means for rotating the said sleeve.

3. In an automobile, a pivotally mounted drag, a drive shaft, a worm on the said drive shaft, a bar connected to the said drag, a sleeve rotatable on said bar but held against longitudinal displacement thereon, teeth projecting from one side of said sleeve and adapted to be moved into and out of engagement with the said worm by rotary movement of the said sleeve, and means for rotating the said sleeve, said means being arranged for manual operation.

4. In an automobile, a pivotally mounted drag, a drive shaft, a worm on said drive shaft, a bar connected to the said drag to operate the latter, a sleeve rotatable on said bar but held against longitudinal displacement thereon, teeth projecting from one side of said sleeve, a pair of arms projecting from said sleeve one near each end thereof, a rod carried by the ends of the said arms and extending longitudinally of the sleeve, a rock shaft, an arm fixed on said shaft and having a slotted end straddling the said rod, and means for rocking the said shaft.

In testimony whereof I have affixed my signature.

FRANK POLLIFRONE.